United States Patent
Dronzek, Jr.

(10) Patent No.: US 6,517,664 B1
(45) Date of Patent: *Feb. 11, 2003

(54) TECHNIQUES FOR LABELING OF PLASTIC, GLASS OR METAL CONTAINERS OR SURFACES WITH POLYMERIC LABELS

(75) Inventor: Peter J. Dronzek, Jr., Thornwood, NY (US)

(73) Assignee: Process Resources Corporation, Thornwood, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/480,300

(22) Filed: Jan. 10, 2000

(51) Int. Cl.$^7$ ............................................. C09J 101/00
(52) U.S. Cl. ...................... 156/328; 156/336; 428/36.5; 428/317.3
(58) Field of Search ................................ 156/328, 336; 428/36.5, 317.3

(56) References Cited

U.S. PATENT DOCUMENTS

| | | |
|---|---|---|
| 2,736,721 A | 2/1956 | Dexter |
| 3,301,741 A | 1/1967 | Henrickson et al. |
| 3,314,838 A | 4/1967 | Erwin |
| 3,681,179 A | 8/1972 | Theissen |
| 3,691,140 A | 9/1972 | Silver |
| 4,025,159 A | 5/1977 | McGrath |
| 4,055,698 A * | 10/1977 | Beery .......................... 428/350 |
| 4,166,152 A | 8/1979 | Baker et al. |
| 4,248,748 A | 2/1981 | McGrath et al. |
| 4,281,040 A * | 7/1981 | Santiago ..................... 428/36.5 |
| 4,376,151 A | 3/1983 | Parrotta |
| 4,440,884 A * | 4/1984 | Jannusch .................... 156/328 |
| 4,556,595 A | 12/1985 | Ochi |
| 4,701,369 A | 10/1987 | Duncan |
| 4,735,837 A | 4/1988 | Miyasaka et al. |
| 4,746,382 A | 5/1988 | Logan |
| 4,777,081 A | 10/1988 | Paschke et al. |
| 4,883,698 A | 11/1989 | Bothe et al. |
| 4,896,943 A | 1/1990 | Tolliver et al. |
| 5,064,272 A | 11/1991 | Bailey et al. |
| 5,066,098 A | 11/1991 | Kult et al. |
| 5,069,964 A | 12/1991 | Tolliver et al. |
| 5,138,488 A | 8/1992 | Szczech |
| 5,209,971 A | 5/1993 | Babu et al. |
| 5,214,119 A | 5/1993 | Leir et al. |
| 5,236,751 A | 8/1993 | Martin et al. |
| 5,238,736 A | 8/1993 | Tseng et al. |
| 5,262,225 A | 11/1993 | Wilson et al. |
| 5,271,766 A | 12/1993 | Koutlakis et al. |
| 5,296,277 A | 3/1994 | Wilson et al. |
| 5,326,625 A | 7/1994 | Schuhmann et al. |
| 5,346,766 A | 9/1994 | Otter et al. |
| 5,387,458 A | 2/1995 | Pavelk et al. |
| 5,425,996 A | 6/1995 | Wilkie et al. |
| 5,449,552 A | 9/1995 | Bochow et al. |
| 5,450,235 A | 9/1995 | Smith et al. |
| 5,478,643 A | 12/1995 | Peiffer et al. |
| 5,487,929 A | 1/1996 | Rusincovitch, Jr. et al. |
| 5,605,761 A | 2/1997 | Burns et al. |
| 5,614,286 A | 3/1997 | Bacon, Jr. et al. |
| 5,629,087 A | 5/1997 | Hartman et al. |
| 5,639,539 A | 6/1997 | DeProspero et al. |
| 5,686,180 A | 11/1997 | Rivlin et al. |
| 5,784,198 A | 7/1998 | Nagaoka |
| 5,795,636 A | 8/1998 | Keller et al. |
| 5,800,913 A | 9/1998 | Mauer et al. |
| 5,885,721 A | 3/1999 | Su et al. |
| 5,900,294 A | 5/1999 | Murschall et al. |
| 5,925,453 A | 7/1999 | Kase et al. |
| 6,004,308 A | 12/1999 | Haddock |
| 6,083,616 A | 7/2000 | Dressler |
| 6,183,856 B1 | 2/2001 | Amon |

FOREIGN PATENT DOCUMENTS

| | | | |
|---|---|---|---|
| DE | 1569879 | * 5/1972 | ............... 427/207.1 |
| EP | 0 166 801 | 1/1986 | |
| EP | 199228 | 10/1986 | |
| EP | 216343 | 4/1987 | |
| EP | 0 279 579 | 8/1988 | |
| EP | 0 429 269 | 5/1991 | |
| GB | 2285467 | 7/1995 | |
| GB | 2286781 | 8/1995 | |
| WO | WO 91/06424 | 5/1991 | |
| WO | WO 96/26221 | 8/1996 | |
| WO | WO 7/07991 | 3/1997 | |
| WO | WO 9711846 | 4/1997 | |
| WO | WO 98/17466 | 4/1998 | |
| WO | WO 99/24671 | 5/1999 | |
| WO | WO 00/56830 | 9/2000 | |

OTHER PUBLICATIONS

Database WPI Section Ch, Week 198511 Derwent Publications Limited, London GB; Class A17, AN 1985–065465 XP002170051 & Japan 60 021444 A (Oji Yuka Goseishi KK) Feb. 2, 1985 (abstract).

*Handbook of Pressure Sensitive Adhesive Technology* pp. 173–173,(Donatas Satas,Ed.) $2^{nd}$ Edition, Von Nostrand Rheinhold, New York, 1989.

3M Brochure, "Cutting, Matching, Premasking and Prespacing of 3M™ Scotchlite™ Reflective Sheetins and Films", pp. 1–8, Information Folder 1.10, Apr. 1998.

* cited by examiner

Primary Examiner—John J. Gallagher
(74) Attorney, Agent, or Firm—Hedman & Costigan, P.C.

(57) ABSTRACT

The invention provides a method for labeling a glass, plastic or metal container or surface with a polymeric label by means of a water based adhesive composition by the following steps:

(a) selecting a polymeric label having a density of less than 0.9;

(b) applying a water based adhesive to said polymeric label to form a fastenable polymeric label;

(c) fastening said fastenable polymeric label to a glass, plastic or metal container or surface; and (d) allowing said polymeric label to dry on said glass, plastic or metal surface or container.

29 Claims, No Drawings

TECHNIQUES FOR LABELING OF PLASTIC, GLASS OR METAL CONTAINERS OR SURFACES WITH POLYMERIC LABELS

FIELD OF THE INVENTION

This invention relates to a method of labeling containers with polymeric materials particularly adapted for use as labels in the post mold labeling of plastic, glass or metal containers or surfaces. More particularly, the present invention relates to the use of particular low density polymeric film substrates adapted for printing that may also have a hydrophilic surface layer for use as labels in post mold labeling applications using conventional wet applied water based labeling equipment and solutions typically used for the application of paper labels. In another aspect the invention relates to such labels which possess the beneficial properties of the known plastic label substrates, but which are able to be applied on conventional post mold paper labeling equipment using wet applied water based solutions comprising water, water blended with a selected catalyst, adhesives or adhesives blended with a selected catalyst and are adapted to facilitate the recycling process when the labels are applied to certain types of containers.

BACKGROUND OF THE INVENTION

Plastic and glass containers or bottles are prevalent in a wide variety of shapes and sizes for holding many different types of materials such as detergents, chemicals, motor oil, beer, etc. These containers are glass or plastic (mono or multi layers) of polyethylene, polypropylene, polyester or vinyl along with other specialty blends for specific barrier and product resistance performance. Generally such containers are provided with a label which designates the trade name of the product and may contain other information as well. The early art which still is prevalent today employed the use of labels manufactured from paper substrates that were applied with a water based adhesive. Subsequently, dry pressure sensitive self adhesives and in mold labels manufactured from paper have been and continue to be used. The shortcomings of paper labels with regard to tearing, wrinkling, creasing and the like due to age and moisture, or due to a lack of deformability when applied to a deformable plastic substrate have been well documented in the labeling industry. Because of this and the need to produce recyclable plastic containers, over the years a great deal of effort has been expended to develop container decoration techniques and durable polymeric film substrates or face stocks which would overcome these shortcomings. Film facestocks for container decoration which have resulted from these efforts can be applied to glass and plastic containers as self adhesive pressure sensitive labels as described in the prior art. The use of self adhesive paper and film "pressure sensitive adhesive" (PSA) labels that have been preprinted and supported on a release liner is not a cost effective option because of the added cost of the release liner used to support and render processable the self adhesive face stock. The cost of this type of structure combined with the added cost of disposal of the liner does not make pressure sensitive labeling a desirable option from an economic or environmental standpoint. In addition, new capital intensive labeling equipment is required to transition from wet applied Post Mold Labels (PML) to self adhesive PSA labels plus the effect of a new process on an existing packaging line in terms of learning cure and experience. Cut PML labeling equipment typically will run to six times the speed of a PSA labeling system.

Another film face stock labeling technique that has evolved is the use of heat activated in-mold labels as described in the prior art where a preprinted plastic label with a heat activated adhesive on the back of the label is placed in the mold before the molten plastic resin is injected or blown into the mold cavity at elevated temperature and pressure which activates the adhesive and fuses the label substrate to the container in-mold. The use of film based in-mold label substrates presents a more cost effective alternative then self adhesive pressure sensitive labels in terms of substrate cost but as this technology has progressed, it has been found that productivity is impacted by the label feeding step into the mold which is performed in a complex, continuous and rapid manner which can result in large amounts of scrap material. Also, the initial capital investment required to tool up for a container specific in-mold label process for new molds and the complex electromechanical maintenance intensive feeding devices is significant. Another detriment for this process is the potential inventory carrying costs for varieties of labeled containers that come into play with predecorated containers such as in-mold for those who would choose to apply the label immediately pre or post filled.

Post mold decoration of glass and plastic containers in the current art can also be accomplished by direct screen printing on the container. Direct screen printing on the container is not a cost effective process and also presents the aforementioned inventory problems along with added cost for freight to and from a screen printer. The graphical possibilities for label copy are limited in terms of cost and quality with this technique. Commodity products can not support the cost of this labeling technique.

Another post mold technique that has been popular is the "Thermage" process. This process transfers a reverse printed image from a transfer release paper under temperature and pressure to produce decorated containers. The "Thermage" technique of transferring a reverse printed image is costly because of transfer release paper costs and presents the same disposal problems and costs with the transfer sheet as occurs with the aforementioned release liner used in conjunction with self adhesive labels.

Other techniques for labeling various plastic and glass containers with preprinted paper or film label substrates include the use of hot melt adhesives which are applied to the label substrate or container in a molten state with container and substrate subsequently married while the hot melt is molten. When the hot melt adhesive cools, it sets up and bonds the label substrate to the container.

This technology requires the use of sophisticated melting and application equipment that must be operated, cleaned and maintained at elevated temperatures. This technology works well with complete 360 degree wrap around labels but has not evolved to the point to allow consistent labeling of a die cut or square cut "patch label" with less than 360 degree wrap. Affixing a patch label to an area on a container with 100% or patterned adhesive application using hot melt adhesives has not been commercially perfected. Complete wrap around hot melt applied labels where one end of the label is affixed to the container while the other end is wrapped around the container greater than 360 degrees to form a glue lap where the trailing edge is affixed with hot melt to the leading edge of the label substrate is proven hot melt label application technology that works well for film and paper label substrates. This labeling technique does not fit for applying patch labels on individually labeled panels of containers such a rectangular oil, contoured detergent or beer containers where a neck and front label only are applied. Another drawback is the added cost for label substrate when this technique is used since more label substrate is required because of the 100% wrap around.

Lastly, and still one of the most prevalent labeling techniques is the application of paper based cut patch labels to glass and plastic containers using natural and synthetic laminating adhesives such as BL300 produced by Henkel Adhesives or OC353-20 produced by O.C. Adhesives Corp. which are known to the art. This is a safe (water based) proven technology that has grown and been employed for many years and consequently there are many existing machines that have been installed for this type of labeling technique such as from Krones, Neutraubling, Germany that run precut patch labels or Koyo, Japan which runs roll stock that is cut into a rectangular or square patch label on the labeling machine to the label size. The cut label techniques and associated adhesives work well with paper based substrates applied to glass or plastic containers because the wet adhesive wicks (absorbs) into the paper substrate from the applicator roll, pad or pallet which breathes and allows the moisture from the water carrier to be absorbed by and dry thru the paper base.

This technique obviously will not work with non-porous polymeric label substrates as the adhesive cannot dry thru (wick into) the polymeric substrate. The adhesive and polymeric label substrate must be chosen to have initial tack and adhesive transfer to the label. Typically, wet applied cut label machines work where glued pallets remove the label out of the label holding magazine while simultaneously gluing the back side of the label. This is accomplished by applying a thin glue film to the pallet which is then pressed in intimate contact against the first label in the stack. After its removal, the label sticks on the entire glued area of the pallet until transferred to a "gripper" cylinder and removed from the pallet. The gripper cylinder then transfers the label to the container to be labeled. The various machine designs and techniques are well known within the labeling industry and to those skilled in the art. The "Krones Manual Of Labeling Technology" by Hermann Kronseder dated December 1978, is hereby incorporated by reference.

Attempts have been made to use polymeric substrates with high moisture vapor transmission rates (MVTR) such as films with micro perforations for drying of the water trapped between the label and the container and high solids tacky or pressure sensitive adhesive for good wet tack on conventional wet water based labeling equipment with little success. The high solids tacky adhesive required to stick to the polymeric substrate causes machining problems by gumming up the adhesive application system and creates cleanup issues. The high MVTR substrates also did not have good wet tack with existing commercially available adhesives that would machine without problems and did not dry rapidly enough making the labels prone to "swimming" or moving from the desired application area during down stream processing. The micro perforated materials allow adhesive to ooze thru the label contaminating the label surface ruining the graphics and making the label sticky. In addition, many of the current paper adhesives do not wet out and apply uniformly to non hydrophilic surfaces with the crude adhesive metering and application systems currently in use on existing paper labeling machinery. Without uniform application, wet out and wet tack, it will be impossible to successfully apply a polymeric label because of adhesive and application imperfections.

When plastic or glass containers are recycled, the first step involves cleaning, then label removal and separation of the labels from the used containers. When polymer labels are removed, they are sometimes difficult to separate from the liquid/label/container mixture that is formed during the recycling process if the density of the polymer label is high enough that it will not readily separate and float on the surface of the liquid that is used for label removal. The applicant has discovered that if the polymer stock for the label is a material having fine micro voids and a density that is substantially lower than the label removal fluid, not only will the labels be easily separated from the container/label/liquid mixture because they float on the surface of the label removal liquid which simplifies the recovery of the glass or plastic container for recycling, but the polymeric labels will also function well in wet glue PML labeling.

Accordingly, it is an object of the invention to provide a polymeric label particularly adapted for use in post mold wet applied labeling of polymeric and glass containers that would readily feed from the label magazine or gripper, adhere with sufficient tack without moving through post labeling handling and processing including but not limited to conveying, filling, case packing and palletizing and is adapted to recycling.

It is also an object of the invention to provide a polymeric label particularly adapted for use in post mold wet applied labeling of polymeric and glass containers that would have sufficient wet tack and affinity for water, a water based solution or adhesive used to allow for transfer of the wet water based adhesive to the polymeric label substrate from the applicator roll(s), pad(s) or pallet(s) of the labeling machine and is adapted to recycling.

It is also an object of the invention to provide a polymeric label for use in post mold wet applied labeling of polymeric and glass containers that would have a coefficient of expansion or contraction under the conditions which the container sees which is the same or compatible with that of the polymeric resin, glass or metal from which the container is made so that expansion and contraction of the container will not wrinkle or otherwise affect the integrity of the label and is adapted to recycling.

It is also an object of the invention to provide a polymeric label for use in wet applied post mold labeling which would combine suitable properties of modulus of elasticity and flexibility and would not be degraded by handling and flexing of the subsequent container and is adapted to recycling.

SUMMARY OF THE INVENTION

In considering the performance or economic shortcomings of prior art materials, I have discovered a process by which a polymeric label may be applied to a glass, plastic or metal container or surface by means of a water based adhesive composition, said method comprising:

(a) selecting a polymeric label having a density of less than 0.9;

(b) applying a water based adhesive to said polymeric label to form a fastenable polymeric label;

(c) fastening said fastenable polymeric label to a glass, plastic or metal container or surface; and (d) allowing said polymeric label to dry on said glass, plastic or metal surface or container.

The invention also provides a plastic metal or glass container having a polymer label comprising a low density polymer, a dried water based adhesive which affixes said polymer label to said container, wherein said polymer label contains a portion of said dried water based adhesive within said polymer.

The use of the low density micro-voided polymer film can allow portions of the water based adhesive to migrate into the film during the drying cycle to provide an enhanced bond between the polymeric label and the container surface and to also impart stiffness to the dried label on the container surface.

DETAILED DESCRIPTION OF THE INVENTION

The preferred low density polymeric labels are made of polypropylene which is commercially available. The preferred density is 0.55 to 0.85, an especially preferred density is 0.6 to 0.75, as distinguished from the conventional polypropylene label stock which has a density above 0.9. These materials are sometimes referred to as cavitated, micro voided or foamed polypropylene. Other polymers which may be used include polyethylene, polyester, polystyrene, polycarbonate or compatibilized polymer blends.

It is preferred to utilize a hydrophilic material in conjunction with the low density polymeric label to allow for more rapid escape of water from the water based adhesive that is placed on the back of the low density polymeric label.

Hydrophilic materials are selected so that their thickness and modulus of elasticity when applied to a polymer film will result in a polymeric film facestock that will have hydrophilicity, absorbtivity, wet tack and drying properties that will permit the polymer film to be applied to polymeric or glass containers via water based wet labeling techniques on standard paper labeling equipment. The apparatus which is used to apply paper labels is well known to those in the art. The polymeric label substrate with the hydrophilic coating will demonstrate sufficient "wet tack" during the label application period and the label drying period to permit containers to be handled and processed. The polymeric film based facestock will provide a label with printability, chemical and dimensional stability, resistance to cracking, tearing, creasing, wrinkling or any other degradation of the sort experienced by paper labels due to physical or environmental extremes.

As used herein, the reference to "a container" includes a surface of an object made of glass, plastic or metal, such a dishes, toys, beer bottles, building materials and the like.

Optionally, if a metalized coating of a thin metal film is deposited on the polymeric sheets or rolls, premium quality decorative labels with all of the advantages set forth above will be provided.

The hydrophilic component or blends containing the hydrophilic component will be applied in the present invention to the selected polymeric sheet in a continuous or patterned layer to provide the absorptive, wet tack and drying properties that are necessary to enable polymeric sheets to be successfully used as label substrates on polymeric or glass containers when applied with water based wet labeling techniques. The hydrophilic layer which may be applied by either a coating or an extrusion technique has the function of absorbing moisture to activate the layer, thus causing the hydrophilic layer to function as an adhesive without any additional adhesive or to absorb the moisture from an adhesive if used and to pass the moisture thru the hydrophilic layer and micro voided substrate to cause the polymer film to adhere to the glass, metal or plastic container and to set up rapidly and positively.

The choice of polymeric substrate for the label film will determine the rigidity, deformability or conformability, regrindability, printability and expansion or contraction characteristics required for application to the selected container without the problems associated with paper labels.

The term "film facestock" or "polymeric label substrate" as used herein should be taken for purposes of the present invention to refer to a monolayer, coextruded, coated or laminated material compatible in terms of rigidity, deformability or conformability, regrindability if a plastic container and expansion or contraction characteristics with the plastic, metal or glass container to be labeled. Similarly, the "hydrophilic layer" previously mentioned has the properties of wet tack, absorbtivity, drying, sufficient adhesion to the polymeric label substrate and affinity and adhesion to the labeling adhesive if used in the wet or dry form.

It is contemplated that selected hydrophilic layers can be wet or remoistened without adhesive for use on a glass or plastic container or a water based adhesive can be used to affix the polymeric label substrate with the hydrophilic layer to the glass or polymeric container. For deformable containers, the adhesive if used, can be selected from those commercially available that are characterized by the ability to form a bond with the container and a hydrophilic layer such that when dry, the strength of the container wall-adhesive interface and the hydrophilic layer-adhesive interface and the cohesive strength of the adhesive itself are all greater than the forces required for deformation of the label.

As used herein and in the appended claims, the term "hydrophilic" is used to describe materials or mixtures of materials which bind, pass or absorb water. The preferred "hydrophilic" materials are those acrylic polymers which bind or absorb water. The especially preferred "hydrophilic" material is DP6-6006, a sodium polyacrylate available from Ciba Specialties.

It is also an aspect of the present invention to use cross-linkable (reactive) components in the hydrophilic layer that can cure with a catalyst supplied in the hydrophilic layer, rewetting water or adhesive (if used) that will promote adhesion to the labeled container along with chemical and moisture resistance. Examples of cross-linkable materials include carboxylated synthetic resins. The catalyst can also be added to the adhesive which could have reactive components which would cure the adhesive and hydrophilic layer together. Examples of cross-linkable components include zirconium salts of mineral acids, polyfunctional aziridine, water soluble polyamide-epichlorohydrin material such as Polycup 172, zinc ammonium carbonate and the like which may be used at a level of 0.2–8% by weight of the adhesive composition.

The coated, extruded or coextruded hydrophilic layers can be defined as substances capable of combining two surfaces by the formation of a bond whether it is a moist hydrophilic layer to glass or polymer or a dry hydrophilic layer to a wet labeling adhesive which as an intermediate layer that bonds to both the hydrophilic layer and glass or polymer of the container when dry.

The use of the proper hydrophilic layer for a given polymeric labeling substrate and container to be labeled will have a direct effect on the speed which the labeling line can be run.

When considering the choice of the material which forms the hydrophilic layer, which may be applied by coating, coextrusion or extrusion, one must consider the label substrate, container to be labeled, labeling machinery, water or adhesive application technique and down stream processing requirements such as filling, conveying and packing. Generally a thickness of from 0.1 to 8 mils of the hydrophilic layer, when dried, may be employed on the polymeric film layer, depending on the particular hydrophilic material that is selected.

It is critical to the successful application of a hydrophilic polymeric film label to control how the water or water based adhesive is applied to the hydrophilic layer, how deposition (weight or thickness) is controlled and how the resultant combination with the container is pressed together. Generally, from 0.25 to 6 mils of water or water based adhesive is applied to the hydrophilic layer with 100% coverage of the label. If a grid or other pattern of adhesive is employed, then the overall amount of adhesive consumed is reduced. If a grid pattern is employed, the hydrophilic layer may be applied to be substantially in register with the adhesive layer. It will generally be possible to reduce the typical amount of adhesive applied to a label when using the hydrophilic layer of the invention to an amount which 20–80% of the amount that is typically employed for affixing paper labels to a surface. The choice of the hydrophilic layer and the type of label substrate and container to be adhered together, as discussed above, the plant processing conditions after labeling, storage requirements and the end use requirements that must be met such as high temperature resistance or ice proofness and the choice of an intermediate adhesive layer are important considerations. There are many more specific variables within these considerations all of which influence the formulation of the proper hydrophilic layer and adhesive (if used) for a specific application.

Mechanical adhesion is defined as the bonding between surfaces in which the adhesive holds the parts together by inter-locking action and actual physical penetration. Specific adhesion is the bonding between surfaces which are held together by molecular forces wherein the surfaces are non-porous and no penetration is possible.

These forces are related to the polarity and size of the molecules and the initial action in obtaining a bond when the hydrophilic surface is wet and a bond develops through molecular forces.

In mechanical as well as specific adhesion, the optional hydrophilic layer with optional intermediate adhesive layer must "wet" both surfaces completely or weak bonded areas will develop as it dries or "sets" resulting in a poor bond. Not only is wetting of the surfaces critical, penetration is also important. Penetration is important since most combinations of surfaces to be adhered together involve at least one porous or absorptive surface which controls the "setting" characteristics. To facilitate specific adhesion, wetting of the surface and penetration are critical for the hydrophilic layer or hydrophilic layer with intermediate adhesive which must be in a fluid state. For purposes of this invention, this is accomplished by applying water or water based adhesive to the selected hydrophilic layer which when applied to the container to be labeled brings the hydrophilic layer and container wall into intimate molecular contact. By using a wet hydrophilic layer or intermediate adhesive which also wets and penetrates the hydrophilic layer as well as the container surface, a fluid region is created that flows to cover the surface as completely as possible. This is critical to the invention where even an apparently smooth surface in reality is composed of a random network of hills and valleys. When the hydrophilic layer is in the wet condition, with or without adhesive, it serves as a wetting bridge to promote adhesion.

Various commercially available adhesives can be utilized to provide good adhesion of polymeric film layers to a plastic, metal or glass surface. These materials include starch based adhesives or casein based adhesives now predominantly used for glass applications since they do not bond well to plastic or metal. Specific adhesives that may be employed include EVA based materials which have free carboxyl groups, converted starch solutions, PVA based adhesives, casein based adhesives, synthetic resin dispersions for metal or plastic containers or blends of synthetic and starch based products and the like.

It is clear that one specific hydrophilic layer may not fit all applications but hydrophilic layers can be tailored to particular applications based on the conditions and requirements for wet PML labeling of polymeric substrates.

If an adhesion promoting tie layer or primer is employed to promote hydrophilic layer adhesion or adhesive adhesion, materials such as maleic anhydride, ethyl acrylic acid, carboxylated polyurethane resin and the like may be employed at levels of 0.1–3 1b/3,000 sq. ft.

If a cross-linking catalyst is added to the adhesion promoting tie layer, the ratio of catalyst to adhesion promoting tie layer may be an amount that is sufficient to cure the adhesion promoting tie layer. An excess of the catalyst, i.e. 5–25% in excess of the amount of the catalyst that is required to cure the adhesion promoting tie layer may be used to provide a portion of the catalyst at the interface of the adhesion tie promoter and the hydrophilic layer to increase the moisture resistance of the hydrophilic layer without decreasing the moisture absorbtivity of the hydrophilic layer. Additionally, excess catalyst can also be available to aid in curing of the adhesive.

Plasticizers such as n-di-octylphthalate may be employed at a level of 0.5–3% by weight of the adhesive composition to prevent the polymeric film label from losing flexibility.

The slip aids and anti-blocking compounds prevent excessive friction between the hydrophilic layer and the adhesive layer and also control the effect of ambient moisture levels which may tend to interfere with the operation of high speed automated machinery which is used for apply labels. These materials may be used at a level of 0.5–3% by weight of the hydrophilic composition or may be coextruded or coated with the low density film and include materials such as microcrystalline wax emulsions, erucamide disp, polytetrafluoroethylene compositions, silicone beads, modified silicone solutions, parafin wax emulsions, high melting polypropylene emulsions, carnauba wax emulsions, oxidized ethylene/EVA compositions, micronized polyethylene wax/PTFE emulsions, micronized polypropylene, micronized fluorocarbons such as PTFE (Teflon), micronized polyethylene, silica and talc.

If an antistatic agent is employed, it may be present at a level of 0.5–3% by weight of the hydrophilic formulation. These materials include quaternary ammonium salts such as Ethaquad C12, sulfonated styrene maleic anhydride, sulfonated polystyrene, sulfonated vinyl toluene maleic anhydride conductive polymers and organo modified silicones such as Silwet 77.

Protective coatings may be used to protect the exposed polymer film of the label when applied at a level of 0.25–4 lbs/3000 sq. ft. using conventional application techniques. These materials include styrenated acrylics such as OC1043 from O.C. Adhesives, Inc., Flexon Release Varnish from Manders-Premier.

If desired a humectant may be added to the hydrophilic layer at a level of 0.5–3% to provide curl resistance and to impart layflat properties to the polymeric film labels. These humectants include urea, polyethylene glycols (such as PEG400), polyvinyl alcohol, glycerine and the like.

DESCRIPTION OF THE PREFERRED EMBODIMENTS

Example 1

2.2 mil white oriented polypropylene (OPP) product code Opalyte from Mobil Chemical with a nominal density of 0.62 was coated at 4 lb./3000 sq. ft. dry with a 50% solids water based solution. The solution consisted of a mixture of 50 parts dry of Dextrin 2723625 from Findley Adhesives and Dextrin compatible Polyvinyl Acetate homopolymer emulsion binder resin 25-1072 from National Starch And Chemical. The coated substrate was printed and cut into individual patch labels which were applied to high density polyethylene containers on a high speed water based labeler using water based resin-starch adhesive OC363-20 from OC Adhesives Corp. at a deposition of 1.5 dry mils in a corn row pattern. There was sufficient wet tack to prevent label swimming immediately after labeling through conveying and bulk packing. The labeled containers dried sufficiently after 8 hours to ship bulk packed to a filling plant 20 miles away by truck where they were conveyed through a filling system and packed in cases. When it was attempted to remove the labels after 3 days, the bond of the label was stronger than the cohesive strength of the cavitated layer of film which fractured and left a thin layer of voided OPP over 55% of the labeled area of the container. It was noted that the adhesive had penetrated the cellular structure of the voided OPP because the tack of the adhesive could be felt on top of the fractured area.

Example 2

Nominal 3 mil white oriented polypropylene (OPP) product code IML-333 from Applied Extrusion Technologies, with a density of 0.7 was coated at 2 lb./3000 sq. ft. with a 40% solids water based solution. The solution consisted of a mixture of ASP400P clay from Engelhard Industries and DP6-6066 sodium polyacrylate binder polymer as a hydrophilic layer in the dry ratio of 2:1 clay to binder. The clay binder mixture was catalyzed with CX-100 polyfunctional aziridine at a level of 0.25% based on the total dry weight of the hydrophilic layer to promote adhesion of the coating to the substrate and improve water resistance without eliminating the hydrophilic nature of the coating. The coated substrate was printed and coated with a protective over lacquer prior to being cut into individual patch labels which were applied to coextruded polyester based containers on a high speed water based labeler using water based starch-resin adhesive 10-7302 from Henkel Adhesives at a deposition of 2 dry mils in a corn row pattern. There was sufficient wet tack to prevent label swimming immediately after labeling through packing. The labeled containers dried sufficiently at the edges after 3 days at room temperature to permit handling and use. When it was attempted to remove the labels, the bond of the label was stronger than the cohesive strength of the cavitated layer of film which fractured and left a thin layer of voided OPP over 70% of the labeled area of the container.

Example 3

A laminate was made which consisted of cavitated polypropylene of trade name WTL (a 2 mil cavitated oriented polypropylene (OPP) from Applied Extrusion Technologies with a density of 0.7) permanently adhered to the underside of a 0.48 mil metalized polyethylene terephthalate from Advanced Web Products. The composite structure was assembled using a urethane-acrylic laminating adhesive (AS284-16 from Adhesion Systems Inc.) applied at 1.5 lb./3000 sq. ft. and 2% of CX-100 aziridine cross-linker from Zeneca resins using conventional laminating techniques.

The OPP side of the laminate was primed with a reactive primer consisting of a carboxylated polyurethane resin Sancure 1301 from Sancure Industries that was catalyzed with excess (5% wet on wet) CX-100 polyfunctional aziridine from Zeneca Resins at a deposition of 0.1–0.2 lb./3000 sq. ft. A coating at 2 dry lb./3000 sq. ft. was applied over the primed surface from a 40% solids water based solution. The solution consisted of a mixture of ASP400P clay from Engelhard Industries and DP6-6066 sodium polyacrylate binder polymer in the dry ratio of 1.5:1 clay to binder. A portion of the excess aziridine in the primer is available on the surface of the cured primer to react with active sites in the DP6-6066/Clay matrix (hydrophilic layer) to promote adhesion of the coating to the substrate and improve water resistance without eliminating the hydrophilic nature of the coating. The coated substrate was printed and cut into individual patch labels which were applied to glass containers on a high speed water based labeler using water based adhesive 10-7026 from Henkel Adhesives at a deposition of 3 dry mils in a corn row pattern. There was sufficient wet tack to prevent label swimming immediately after labeling through packing. The labeled containers dried sufficiently at the edges after 1 day at room temperature or 3 days in cold storage to permit handling and use. When it was attempted to remove the labels, the bond of the label was stronger than the cohesive strength of the cavitated layer of film which fractured and left a thin layer of voided OPP over 75% of the labeled area of the container. In areas where the metalized PET could be separated from the OPP, it was noticed that the adhesive had penetrated the cellular structure of the voided OPP. This was noticed because the moist surface and wet tack of the adhesive drying through the cellular structure could be felt on top of the OPP fractured area.

EXAMPLE 4

A cavitated polypropylene film from Applied Extrusion Technologies, (IML 333) with a density of 0.7 was coated on one side of the film with clay filled acrylic resin at a ratio of 3 parts clay to 1 part resin (PD959-400 from Process Resources Corp.) at a coating level 1.5 lb/3,000 sq. ft. using 2% CX-100 aziridine as a cross-linker. The film is printed with label indicia on the uncoated side and patch labels were cut and applied to glass bottles using a water based starch-resin adhesive with zinc cross-linker (AS692-1 from Adhesion Systems, Inc.). After two weeks, it was determined that the labels were fully dried and adherent to the glass bottles.

I claim:

1. A method of labeling a glass, plastic or metal container or surface by means of a water based adhesive composition, said method comprising:
   (a) selecting a printable polymeric label having a density of 0.6 to 0.75, which allows water to migrate into said label;
   (b) applying a water based adhesive to said polymeric label to form a fastenable polymeric label;
   (c) fastening said fastenable polymeric label to a glass, plastic or metal container or surface; and
   (d) drying said polymeric label on said glass, plastic or metal surface or container to form a label.

2. A method for labeling a glass, plastic or metal container as defined in claim 1 wherein a hydrophilic layer is applied to said low density polymeric film before said water based adhesive is applied, said water based adhesive covering from 20 to 80% of said low density polymeric film.

3. A method for labeling a glass, plastic or metal container as defined in claim 2 wherein water is applied to said hydrophilic layer to form a fastenable polymeric label.

4. A method for labeling a glass, plastic or metal container as defined in claim 2 wherein a waterbased adhesive containing a catalyst is applied to said hydrophilic layer to form a fastenable polymeric label.

5. A method for labeling a glass, plastic or metal container as defined in claim 2 wherein a reactive agent which crosslinks with either the hydrophilic layer the adhesive layer or both layers is included in the hydrophilic layer or the adhesive layer.

6. A method for labeling a glass, plastic or metal container as defined in claim 2 wherein the hydrophilic layer is a coated, coextruded or extruded layer.

7. A method for labeling glass, plastic or metal container as defined in claim 6 where hydrophilic layer is a coated layer.

8. A method for labeling a glass, plastic or metal container as defined in claim 2 wherein the adhesive is applied with 100% coverage or in a pattern to the hydrophilic layer.

9. A method for labeling a glass, plastic or metal container as defined in claim 2 wherein less adhesive is applied than is normally applied to a paper label.

10. A method for labeling a glass, plastic or metal container as defined in claim 2 wherein the polymeric label is a mono-layer or coextruded film selected from white or colored polypropylene, polyethylene, polyester, polystyrene, polycarbonate or compatibilized polymer blends.

11. A method for labeling a glass, plastic or metal container as defined in claim 2 wherein the polymeric label includes a reverse printed clear polymeric film which is laminated to the low density polymeric label surface.

12. A method for labeling a glass, plastic or metal container as defined in claim 2 wherein an adhesion promoting tie layer or primer is used to promote adhesion of the hydrophilic layer to the polymer label.

13. A method for labeling a glass, plastic or metal container as defined in claim 2 wherein an adhesion promoting layer is used on a print surface of the polymer label to promote indicia adhesion.

14. A method for labeling a glass, plastic or metal container as defined in claim 2 wherein a protective coating is applied over the surface of the printed indicia is formulated with slip aids and/or anti-static agents to control the coefficient of friction and static properties between the hydrophilic layer and protective coating for optimum high speed application.

15. A method for labeling a glass, plastic or metal container as defined in claim 2 wherein a protective coating is applied over the surface of the printed indicia is formulated with anti-block and/or anti-stick aids to control the blocking tendency of the moisture holding hydrophilic layer for optimum high speed application.

16. A method for labeling a glass, plastic or metal container as defined in claim 2 wherein a protective coating is applied over the surface of the exposed polymer layer is formulated with slip aids and/or anti-static agents known to those in the art to control the coefficient of friction and static properties between the hydrophilic layer and protective coating for optimum high speed application.

17. A method for labeling a glass, plastic or metal container as defined in claim 2 wherein a protective coating is applied over the surface of the exposed polymer layer is formulated with anti-block and/or anti-stick aids to control the blocking tendency of the moisture activated hydrophilic layer for optimum high speed application.

18. A method for labeling a glass, plastic or metal container as defined in claim 2 wherein the hydrophilic layer is formulated with humectants for curl control and/or anti-block aids to control the layflat and blocking properties of the label for optimum high speed application.

19. A method for labeling a glass, plastic or metal container as defined in claim 2 wherein the aqueous label adhesive is based on starch, casein, synthetic polymer or blends of starch, casein or synthetic polymers.

20. A method for labeling a glass, plastic or metal container as defined in claim 2 wherein the hydrophilic layer is activated by water into an adhesive layer which is a derivative of polyacrylic acid or polyacrylic acid copolymer.

21. A method for labeling a glass, plastic or metal container as defined in claim 20 wherein the hydrophilic layer is activated by water into an adhesive layer which is a carboxylated sodium polyacrylate.

22. A method of labeling a glass, plastic or metal container or surface by means of a water based adhesive composition, said method comprising:
(a) selecting a polypropylene label having a density of 0.55–0.85, which allows water to migrate into said label;
(b) applying a water based adhesive to said polypropylene label to form a fastenable label;
(c) fastening said fastenable label to a glass or plastic container or surface; and
(d) drying said polypropylene label on said glass or plastic container or surface to form a label.

23. A method of labeling a glass, plastic or metal container or surface by means of a water based adhesive composition, said method comprising:
(a) selecting a printable polymeric label having a density of 0.55 to 0.75, which allows water to migrate into said polymeric label, said polymeric label having a hydrophilic layer applied by an extrusion technique;
(b) applying an adhesive which consists essentially of a water based adhesive to said hydrophilic layer of said polymeric label to form a fastenable polymeric label;
(c) fastening said fastenable polymeric label to a glass, plastic or metal container or surface; and
(d) drying said polymeric label on said glass, plastic or metal surface or container to form a label.

24. A method for labeling a glass, plastic or metal container as defined in claim 23 wherein a waterbased adhesive containing a crosslinking agent is applied to said hydrophilic layer to form a fastenable polymeric label.

25. A method for labeling a glass, plastic or metal container as defined in claim 23 wherein the crosslinking agent is cross-linkable with either the hydrophilic layer, the adhesive layer or both layers.

26. A method of labeling a glass, plastic or metal container or surface by means of a water based adhesive composition, said method comprising:
(a) selecting a polypropylene label having a density of 0.6–0.75, which allows water to migrate into said label;
(b) applying an adhesive which consists essentially of a water based adhesive to said polypropylene label to form a fastenable label;
(c) fastening said fastenable label to a glass or plastic container or surface; and
(d) drying said polypropylene label on said glass or plastic container or surface to form a label.

27. A method of labeling a glass, plastic or metal container or surface by means of a water based adhesive composition, said method comprising:
(a) selecting a low density polypropylene label having a density of 0.6–0.75, which allows water to migrate into said label;
(b) applying an adhesive which consists essentially of a water based adhesive to said polypropylene label to form a fastenable label; said water based adhesive being applied at a level of 0.25 to 6 mils;

(c) fastening said fastenable label to a glass or plastic container or surface; and (d) drying said polyprolene label on said glass or plastic container or surface to form a label.

28. A method of labeling a glass, plastic or metal container or surface by means of a water based adhesive composition, said method comprising:

(a) selecting a printable polymeric label having a density of 0.55 to 0.75, which allows a water based adhesive to migrate into said polymeric label during the drying cycle to provide an enhanced bond between the polymeric label and a container surface, said polymeric label having a hydrophilic layer applied by an coextrusion or extrusion technique;

(b) applying an adhesive which consists essentially of a water based adhesive to said hydrophilic layer of said polymeric label to form a fastenable polymeric label;

(c) fastening said fastenable polymeric label to a glass, plastic or metal container or surface; and (d) drying said polymeric label on said glass, plastic or metal surface or container to form a label.

29. A method of labeling a glass, plastic or metal container or surface by means of a water based adhesive composition, said method comprising:

(a) selecting a printable polymeric label having a density of 0.55 to 0.75, which allows a water based adhesive to migrate into said polypropylene label during the drying cycle to provide an enhanced bond between the polypropylene label and a container surface, said polypropylene label having a hydrophilic layer applied by an coextrusion or coextrustion technique;

(b) applying an adhesive which consists essentially of a water based adhesive to said hydrophilic layer of said polypropylene label to form a fastenable polypropylene label;

(c) fastening said fastenable polypropylene label to a glass, plastic or metal container or surface; and (d) drying said polypropylene label on said glass, plastic or metal surface or container to form a label.

* * * * *